Aug. 8, 1950     O. H. BANKER     2,518,269
SHIFT CONTROL FOR AUTOMATIC CHANGE-SPEED TRANSMISSIONS
Filed Dec. 5, 1946     2 Sheets-Sheet 1

Inventor
Oscar H. Banker
By Stone, Artman & Binson
Attys.

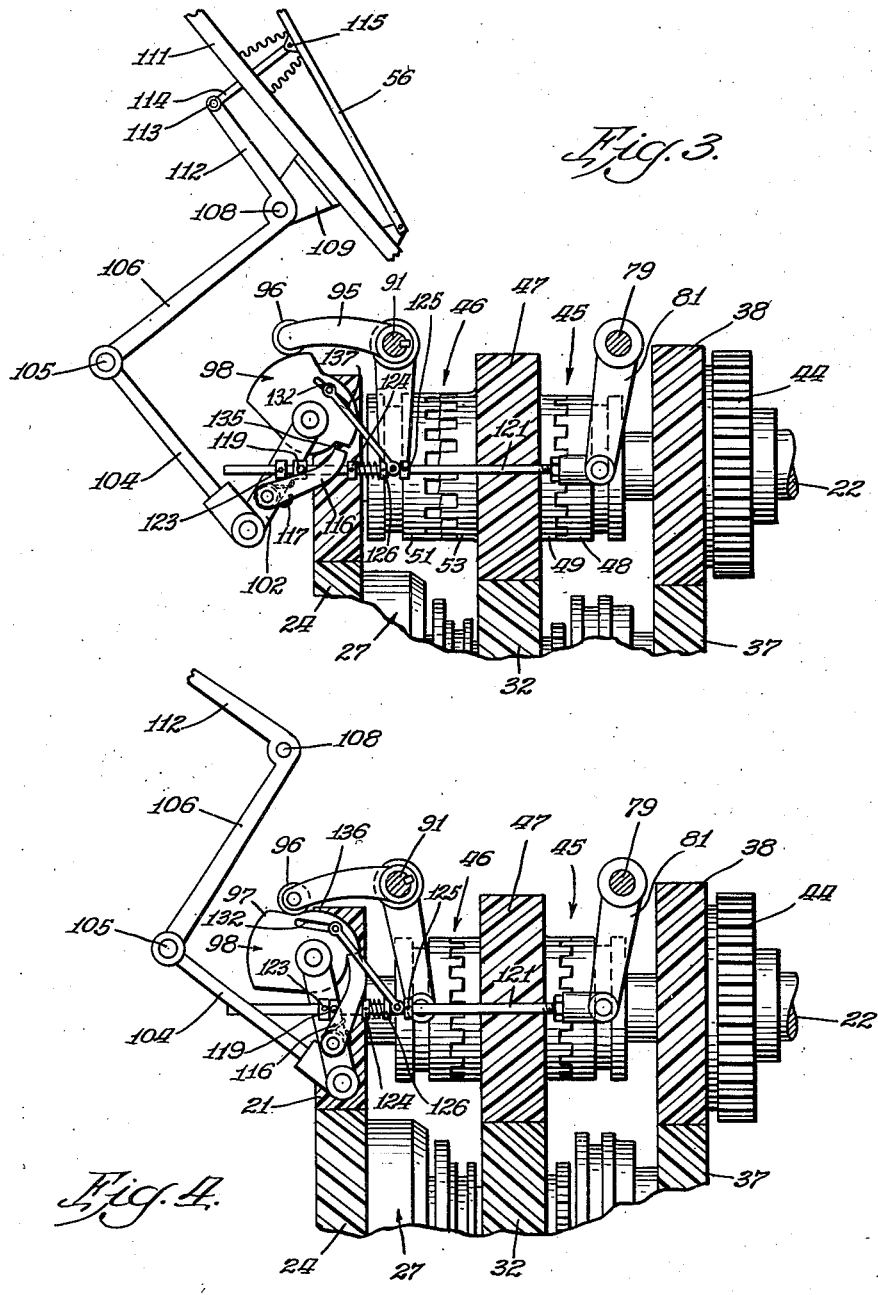

Patented Aug. 8, 1950

2,518,269

UNITED STATES PATENT OFFICE 2,518,269

SHIFT CONTROL FOR AUTOMATIC CHANGE-SPEED TRANSMISSIONS

Oscar H. Banker, Evanston, Ill., assignor to New Products Corporation, Chicago, Ill., a corporation of Delaware Application December 5, 1946, Serial No. 714,263

8 Claims. (Cl. 74—472)

This invention concerns change-speed transmissions and has to do more particularly with a control mechanism for preventing premature automatic shift from a power train of relatively low speed transmission to a power train of relatively high speed transmission.

The invention is particularly adapted for use with a change-speed transmission of the character disclosed in my copending application, Serial No. 357,388, now Patent No. 2,449,964. Such transmission, when installed between the engine and road wheels of an engine driven vehicle, is adapted to drive the road wheels at a slow speed ratio and to automatically shift from such slow speed power train successively into an intermediate speed power train and into a still higher speed power train while the throttle of the vehicle engine is closed to cause the engine to decelerate with respect to the vehicle road wheels. In said transmission the establishment of the intermediate speed power train in driving relation between the engine and road wheels occurs incident to the synchronization and meshing of jaw components of a first clutch. Following this establishment of the intermediate speed power train, the engine throttle can be opened for accelerating the engine and causing it to transmit driving force through the intermediate speed power train to the vehicle road wheels.

A subsequent closing of the engine throttle causes a second deceleration of the engine and the synchronization and meshing of jaw components of a second clutch in the transmission for establishing the driving relation of the higher speed power train so that incident to the subsequent opening of the engine throttle the engine is effective through this higher speed power train for driving the road wheels at a higher speed with respect to that of the engine.

In the normal operation of a vehicle equipped with a change-speed transmission of this kind the shift from the lower speed to the intermediate speed followed immediately by causing the vehicle to be driven from the engine through such intermediate speed power train prior to a second deceleration of the vehicle engine for establishing the higher speed power train is usually desired. However, it is possible, after the vehicle has gained inertia and after closing of the engine throttle for causing a shift to be made from the lower speed train to the intermediate speed train, to retain the engine throttle closed sufficiently long that synchronization of the second clutch will occur whereby when the operator opens the throttle, he may have inadvertently caused establishment of the higher speed train instead of establishment of the intermediate speed train. The general object of this invention is the provision of a mechanism which precludes an inadvertent shift from the lower speed train through the intermediate speed train to the higher speed train of a transmission of the character described.

A more specific object of the invention is the provision of a power train shift control apparatus which includes means for obstructing establishment of the higher speed train until the intermediate speed train has been established and the engine throttle opened.

A further object of the invention is the provision of a change-speed power train control apparatus wherein there is an obstructing means for preventing establishment of a higher speed power train together with means operable coordinately with opening of the engine throttle for disabling the obstructing function of the obstructing means when the throttle is opened and wherein there is an additional means operable coordinately with the establishment and disestablishment of a lower speed power train for precluding the disablement of the obstructing function of said obstructing means while said lower speed train is disestablished.

The above and other desirable objects inherent in and encompassed by the invention will become better understood from the ensuing description and the annexed drawings, wherein:

Fig. 3 is a side elevational view of the control apparatus in conjunction with a fragmentary portion of the change-speed gearing but illustrating components of the apparatus in the position occupied when an intermediate speed power train of the transmission is established for power transmission.

Fig. 4 is a view taken similarly to Fig. 3 but illustrating the elements of the control apparatus in the positions occupied when a second clutch is also engaged for establishing a higher speed power train power transmitting relation.

Figure 1:
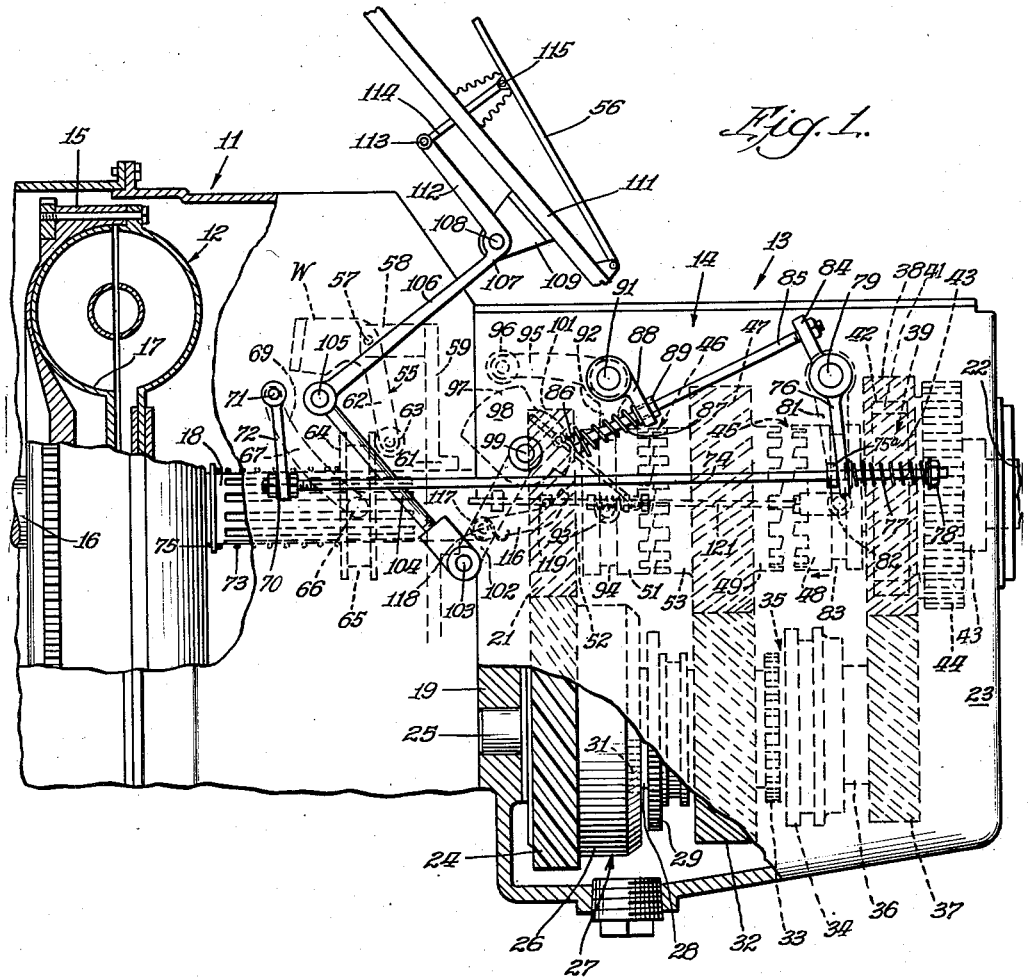
Fig. 1 is a side elevational view of a preferred form of the invention installed for use in conjunction with a change-speed transmission of the character adapted to be controlled thereby.

With continued reference to the drawings and particularly to Fig. 1, there is shown a bell housing 11 for containing a fluid coupling device 12, and a gear box 13 containing a change-speed transmission gearing generally designated 14. A vaned driving element 15 of the fluid coupling 12 is constrained for rotation coaxially with the rear end of an engine crankshaft 16. Vaned driven element 17 of the fluid coupling is driven from the driving element 15 of such coupling by a fluid contained in the coupling in a manner well understood in the art. Said driven member of the coupling device is constrained for rotation with and drives a transmission drive shaft 18.

The transmission drive shaft 18 extends a short distance through a front wall 19 of the gear box 13 where said shaft is journaled in any conventional manner (not shown). The rear end portion of the transmission drive shaft has a gear 21 constrained for rotation therewith. A driven shaft 22 of the transmission is arranged coaxially with the drive shaft 18 and extends from a piloted coaxial relation in a recess (not shown) in the rear end portion of the drive shaft, rearwardly through a bearing (not shown) supported in the rear wall 23 of the transmission gear box. The details of this transmission are sufficiently shown and described in said co-pending application, Serial No. 357,388, now Patent No. 2,449,964.

Drive shaft gear 21 meshes with and constantly drives a countershaft gear 24 rotatively supported upon a countershaft rod 25 of which the two ends are supported in the front and rear walls of the gear box, only the forward end of the rod 25 being shown in the drawings, Fig. 1. A driving element 26 of an overrunning clutch device 27 is constrained for rotation with the gear 24 and a driven element 28 of said overrunning clutch device is adapted to be driven only in counterclockwise direction from the element 26 as the device is viewed from the left or forward end of the countershaft rod. The overrunning feature of said overrunning clutch is circumvented when a jaw clutch element 29 which is splined to the driven element 28 is slid forwardly into mesh with a toothed counterpart 31 formed on the inner periphery of the element 26.

A second countershaft gear 32, is constrained for rotation with the overrunning clutch driven element 28 as also is a jaw clutch component 33. A jaw clutch element 34 which is complemental with the element 33 in forming a jaw clutch 35, is splined to a member 36 which is constrained for rotation with a countershaft gear 37 wherefore when the element 34 is slid forwardly from the position shown for meshing with the element 33 and closing the clutch 35, the gears 32 and 37 and the overrunning clutch driven element 28 are all constrained for rotation in unison.

Gear 37 meshes with and drives a gear 38 which is supported on and rotatable coaxially about the driven shaft 22. Said gear 38 also forms one element of an overrunning clutch device 39 which comprises conventional clutch rollers 41 cooperable with a cylindrical inner periphery 42 of the gear 38 and a cam-bearing hub member 43 which is constrained for rotation with the driven shaft 22. A gear 44 is constrained for rotation with the driven shaft and forms part of a reverse gearing which is not shown excepting for the portion comprised by said gear 44.

Normally the jaw clutch 29—31 will be disengaged as shown and the jaw clutch 35 will be engaged. Under these circumstances and while jaw clutches 45 and 46 are disengaged, a low speed power train will be established in driving relation between the drive shaft 18 and the driven shaft 22, this power train comprising the gears 21 and 24, overrunning clutch 27, the hub of gear 32, jaw clutch 35, the gears 37 and 38, and the overrunning clutch 39. A shift from this low speed train to an intermediate speed train is effected by engaging the clutch 45 while the clutch 46 remains disengaged. Such engagement of the clutch 45 will establish the intermediate power train in driving relation between the drive and driven shafts, said train comprising the gears 21 and 24, overrunning clutch 27, gear 32, a gear 47 which is journaled upon the driven shaft 22, and said engaged clutch 45 of which a driven component 48 is constrained for rotation with the driven shaft 22. A toothed driving element 49 of the jaw clutch 45 is constrained for rotation with the gear 47 and the clutch is engageable by sliding the toothed component 48 forwardly into mesh with the teeth of the component 49.

During establishment of said intermediate speed train the driven shaft 22 and the hub 43 of the overrunning clutch 39 are driven at an overspeed with respect to the gear 38 as permitted by the overrunning clutch rollers 41.

Establishment of a higher speed train, which constitutes a direct connection between the drive and driven shafts 18 and 22, is accomplished by engagement of the jaw clutch 46 while the jaw clutch 45 remains engaged. Clutch 46 comprises a toothed component 51 splined to a hub extension 52 of the gear 21 and also comprises a toothed counterpart 53 which is constrained for rotation with the gear 47. Engagement of the clutch 46 establishes the higher speed power train and thereby causes the transmission of power from the drive shaft 18 through said clutch 46, through the hub of gear 47 and engaged clutch 45 to the driven shaft.

The power trains are selectively established in driving relation jointly under control of a speed responsive apparatus 55 and a throttle operator 56 which is illustrated in the form of a foot-operated pedal. The speed responsive mechanism includes a plurality of inertia weights W (one being shown in Fig. 1) spaced circumferentially about the drive shaft 18 and each pivotally supported upon a pin 57 suitably anchored upon ears 58 of a plate 59 having a hub portion 61 surrounding and constrained for rotation with the drive shaft. Each weight W has a stem 62 carrying a roller 63 for bearing against the rear end face of a collar 64 which is freely slideable axially of the drive shaft. A circumferential groove 65 of the collar 64 receives studs 66 in diametrically opposite portions thereof and these studs 66 are mounted upon respective arms 67 of a yoke 69 which is fixed upon a shaft 71 rotatively mounted in the housing 11 and having a portion extending exteriorly of the housing where an arm 72 is mounted for rotation or oscillation therewith. A helical spring 73 reacts between the collar 64 and a snap ring 75 on the shaft 18 for urging the collar rearwardly and thereby urging the weights W to pivot counterclockwise about their pivot pins 57 to the position illustrated in Fig. 1 which is occupied by these weights when the drive shaft 18 is at rest.

The exterior arm 72 of the speed responsive apparatus is loosely connected at 70 with the forward end of a reciprocable rod 74. The rear end of rod 74 carries a stop member 75ª and that portion of the rod rearwardly of said stop member projects through a hole in the lower end of a first arm member 76. A spring 77 reacts between a nut 78 on the rear end of the rod 74 and the lower end of the member 76 for urging this member against the stop member 75a as illustrated in Fig. 1.

The first arm member 76 is mounted on and constrained for rotation with a cross shaft 79 pivotally mounted in the gear box 13. A portion of this cross shaft within the gear box has the upper end of a shifter fork 81 constrained for pivotal movement therewith and the lower ends of the yoke arms carry studs 82 conventionally projecting into diametrically opposite portions of a groove 83 circumscribing the clutch component 48. Clockwise rotation of the member 76 and of the cross shaft 79 will cause like rotation of the shifter fork 81 for engaging the jaw clutch 45.

Pursuant to engagement of the clutch 45 the parts will assume the position illustrated in Fig. 3, and the clockwise movement of extension 84 of the first arm member 76 will cause rearward endwise movement of a rod 85. The forward end of the rod 85 carries a stop member 86 which serves as a reaction means for a spring 87 whereby this spring in tending to expand has a tendency to pivot a second arm member 88 counterclockwise against a second stop 89 on the rod 85.

The second arm member 88 is constrained for rotation with an outer end portion of a cross shaft 91 which is pivotally mounted in the gear box. A shifter fork 92 is mounted on a section of the shaft 91 within the gear box and is constrained for pivoting therewith. Studs 93 on the lower ends of arms of the shifter fork 92 are disposed in diametrically opposite portions of a groove 94 circumscribing the jaw clutch component 51 so that counterclockwise pivoting of the shaft 91 will cause engagement of the jaw clutch 46.

The cross shaft 91 has a second arm, 95, mounted on a portion thereof within the gear box in a manner causing the arm and shaft to pivot in unison. A roller 96 on the free end of the arm 95 is disposed for engaging the profile of an obstructing structure in the form of a cam lobe 97 of a cam 98. So long as the cam lobe 97 is in the position illustrated in Figs. 1 and 2, counterclockwise rotation of the cross shaft 91 and of the shifter fork 92 is limited and complete engagement of the jaw clutch 46 precluded.

The cam 98 which is mounted for pivotal movement upon a shaft 99 mounted in a side wall of the gear box, has a dwell profile portion 101 which, when is registry with the roller 96, will permit counterclockwise rotation of the shifter fork 92 and complete engagement of the clutch 46. One end of a link 102 is also pivotally mounted on the shaft or stud 99. This link 102 has its lower end pivotally connected at 103 with the lower end of a link 104 of which the upper end is pivotally connected at 105 with the outer end of one arm 106 of a bell crank 107. Said bell crank is secured to a throttle operating rod 108 pivoted in a bracket 109 suitably secured to the underside of a floor board 111 in the driver's compartment of a vehicle. The free end of the other arm, 112, of the bell crank is pivotally connected at 113 with a rod 114 having an upper end portion pivotally connected at 115 with the accelerator pedal 56.

When the accelerator pedal 56 is depressed, the bell crank 107 will be pivoted counterclockwise and motion will be transmitted through the link 104 for pivoting the link 102 counterclockwise about the stud 99. So long as a pawl 116 is retained in a clockwise position illustrated in Figs. 1 and 2 against the urge of a spring 117 which is coiled about a pivot pin 118 which pivotally carries said pawl on the link 102, such counterclockwise pivoting of the link 102 will have no effect. The clockwise position of the pawl 116 is maintained by a stop 119 on an axially shiftable rod 121 when this rod is held at the rightmost limit of endwise movement illustrated in Fig. 1. The endwise position of the rod 121 is determined by the pivotal position of the shifter fork 81 to the lower end of which the rear end of the rod 121 is pivotally connected at 122; see Fig. 2. The forward end of the rod 121 is slidable within a guide 123 carried by the link 102, and this rod 121 carries second and third stops 124 and 125. A slider 126 is urged axially of the rod 121 against the stop 125 by a spring 127 which reacts against the stop 124. This slider 126 has a link 128 pivotally connected therewith at 129 and the upper end of this link carries a stud 131 slideably within a slot 132 of the cam 98.

Figure 2:
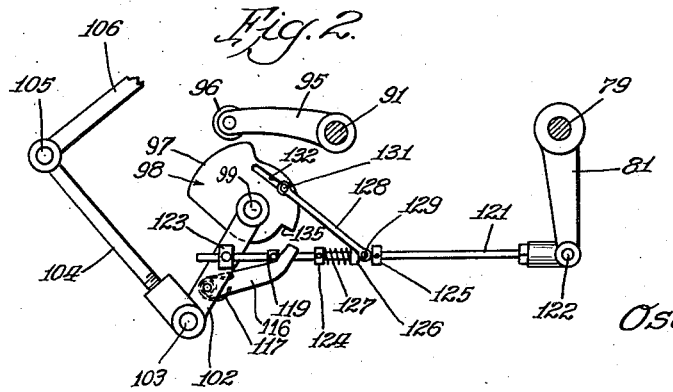
Fig. 2 is a side elevational view of the change-speed transmission control apparatus in the position in which it is shown in Fig. 1 but apart from the transmission.

It will be assumed that the jaw clutch 35 of the change-speed gearing is engaged and that the apparatus is at rest in the position illustrated in Figs. 1 and 2. When the operator desires to start the vehicle, he will depress the accelerator pedal 56 and in so doing will increase the speed of the vehicle engine conventionally. An increased speed of the vehicle engine will establish the coupling function of the fluid coupling device 12 so that the transmission drive shaft 18 will commence to rotate. Power will then be transmitted to the transmission driven shaft 22 through the low speed power train consisting of the gears 21 and 24, the overrunning clutch 27, the hub of gear 32, jaw clutch 35, gears 37 and 38, and the overrunning clutch 39 to the driven shaft 22.

As the vehicle and the transmission drive shaft 18 gain speed the centrifugal weights W will become effective for pressing a collar 64 forwardly upon the shaft 18 and thereby pivoting the lever structure 69—72 clockwise and thereby moving the rod 74 endwise forwardly. This movement of the rod 74 causes the spring 77 to pivot the first pivotable member 76 clockwise sufficiently far to bring the ends of the clutch teeth on the clutch counterpart 48 against the ends of the teeth on the clutch counterpart 49. At this time the counterpart 49 is rotating at greater speed than the counterpart 48 so the ends of the teeth of these two counterparts are beveled to facilitate a ratcheting condition to prevail. After the clutch counterpart 48 is stopped in its forward movement by the abutment of its teeth with the counterpart 49, continued forward movement of the rod 74 under force from the speed responsive mechanism caused the spring 77 to become compressed and store energy for engaging the clutch 45 when its counterparts are substantially synchronized. Synchronization of the counterparts of the clutch 45 is brought about by releasing the accelerator pedal 56 and thereby permitting the drive shaft 18, the gears 21 and 24 and the gears 32 and 47, to decelerate relatively to the clutch counterpart 48 which continues rotating according to the speed of the vehicle-propelling means with which it is directly connected through the driven shaft 22. After deceleration of the gear 47 and the clutch counterpart 49 to synchronism with the counterpart 48, the stored energy in the spring 77 will pivot the shifter fork 81 for completing engagement of the clutch 45. The intermediate speed power train is then effective for transmitting driving force between the transmission drive and driven shafts when the accelerator is next depressed. This intermediate speed power train includes the gears 21 and 24, overrunning clutch 27, the gears 32 and 47 and the then engaged clutch 45. Meanwhile, overrunning occurs at the overrunning clutch 39.

Pursuant to clockwise rotation of the pivoted member 76—84, the rod 85 is pulled endwise rearwardly, and by means of force transmittal through the spring 87 causes the shifter fork 92 to pivot counterclockwise a distance limited at this time by abutment of the roller 96 with lobe 97 of the blocking structure 98. This limited counterclockwise pivoting of shifter fork 92 is just enough to carry the beveled ends of the teeth on clutch component 51 into ratcheting relation with similar ends on the teeth of clutch component 53 as illustrated in Fig. 3. Thus the jaw clutch 46 is conditioned to permit deceleration of the engine and transmission drive shaft 18 relatively to the vehicle and the transmission driven shaft 22, or, acceleration of the vehicle relatively to the engine until the speed of the driven shaft attains that of the drive shaft. Since ratcheting between the clutch components 51 and 53 can occur in only one direction, any tendency for the driven shaft to exceed the speed of the drive shaft will be prevented by the clutch 46 and the engaged clutch 45, making the engine available as a vehicle brake.

The above-described clockwise pivoting of member 76—84, incident to fully engaging the rear clutch 45, moves the rod 85 rearwardly far enough to compress the spring 87 and store energy therein for pivoting the lever 88 and the shifter fork counterclockwise when the cam lobe 97 is subsequently removed from registry with the roller 96. It should be noted that if the obstructing means 98 were not present, the energy stored in the spring 87 by the rearward movement of the rod 85 would be effective unconstrainedly for pressing the beveled ends of the teeth on the jaw clutch component 51 against the beveled ends on the teeth of the clutch component 53 so that if the operator, while intending to make the shift from the slow to the intermediate speed, should permit engine deceleration sufficiently long, the clutch component 51 would slow down to synchronism with the component 53, wherefore the clutch 46 would also become engaged and the higher speed power train thereby established when the accelerator pedal was subsequently depressed. The operator would have inadvertently established the connection of the higher speed power train instead of the intermediate speed power train.

While the blocking structure 98 is effective for preventing fortuitous engagement of the higher speed power train, this blocking means is controlled so that it is ineffective for blocking establishment of the higher speed train subsequent to the transmittal of power through the intermediate speed power train.

Fig. 3 illustrates the control parts in the position occupied at the instant the clutch 45 engages for establishing the second speed power train. An examination of Fig. 3 will reveal that the shifter fork 81 in pivoting clockwise will have moved the rod 121 endwise forwardly whereby the stop member 119 thereon is no longer effective for holding the pawl 116 in the inoperative position illustrated in Figs. 1 and 2. The spring 117 is then effective for pivoting the pawl counterclockwise into an operating position with respect to a shoulder 135 so that when the operator next depresses the accelerator pedal and causes counterclockwise pivoting of the link 102, the pawl will press against the shoulder 135 for pivoting the obstructing structure 98 counterclockwise in the manner illustrated in Fig. 4 so that the short radius dwell 136 will register with the roller 96 instead of the lobe 97.

This pivoting of the obstructing structure 98 into the position illustrated in Fig. 4 occurs while the accelerator pedal is depressed and therefore while power is being transmitted through the second speed power train and therefore while the clutch counterpart 51 is ratcheting over the counterpart 53. The stored energy in the compressed spring 87 is therefore ineffective for engaging the clutch 46 until a subsequent release of the accelerator pedal 56 for permitting the drive shaft and the clutch counterpart 51 to decelerate to the speed of the counterpart 53. When this occurs, the clutch 46 will engage and both clutches 45 and 46 will then be engaged for establishing the higher speed connection which is a direct connection between the drive and driven shafts 18 and 22.

Counterclockwise rotation of the obstructing structure 98 from its active position shown in Figs. 1 to 3 to its inactive position of Fig. 4 causes end 137 of the slot 132 to carry up against the stud 131 of the link 128 so that this stud can impart clockwise pivoting to the obstructing structure for re-establishing the active position of said structure when desired.

When the vehicle slows down sufficiently while the accelerator pedal 56 is released diminishing side pressure on the teeth of engaged clutches 45 and 46 the inertia force of the weights W will be overcome by the spring 73 which will force the collar 64 rearwardly while causing the rod 74 to move rearwardly whereby the stop 75ª on this rod will press against the pivoted member 76 with sufficient force for opening the clutch 45. Concurrently the pivoted member 76—84 forces the rod 85 forwardly so that the stop member 89 thereon pivots the second pivoted member 88 clockwise for disengaging the clutch 46 and lifting the roller 96. Rearward endwise movement of the rod 121 also occurs at this time whereby the link 128 restores the obstructing structure 98 to its active position of Fig. 1, and the stop 119 restores the pawl or actuator member 116 to its inoperative position where it is inactive for pressing against the shoulder 135 when the accelerator throttle is depressed. The apparatus will then be restored to the initial position shown in Figs. 1 and 2 where the transmission is effective for driving the driven shaft from the drive shaft through the slow speed power train. The control apparatus is then effective for again causing the above described sequence of change-speed operations upon the depression of the accelerator pedal for starting the vehicle.

Having thus described a limited number of embodiments of the invention with the view of clearly and concisely illustrating the same, I claim:

1. In a control for use in conjunction with a throttle operator for an engine which drives a load at selective relative speeds through a change-speed transmission wherein there are first and second clutches adapted for successive engagement for accordingly establishing the driving relation of relatively high speed and low speed power trains of such transmission pursuant to retraction of the throttle operator and consequent deceleration of the engine relatively to said load; the combination of a first member displaceable pursuant to engagement of the first clutch, a second member displaceable as a precedent to engagement of the second clutch, an obstructing structure movable from an obstructing position wherein it blocks such displacement of said second member to an inactive position wherein it is ineffective for such obstruction, an actuator member connected with said throttle operator for advancement and retraction therewith, said actuator member having an operating position wherein it is effective, when advanced, for displacing said obstructing structure into its inactive position but being withdrawable into a non-operating position wherein it is ineffective, and means operable under control of said first displaceable member for retaining said actuator member in its non-operating position while the first clutch is disengaged and for causing placement of said actuator member into its effective position when said first displaceable member is displaced pursuant to engagement of the first clutch.

2. In a control for use in conjunction with a change-speed transmission driven from a throttle-controlled engine and wherein such transmission has an engine-driven drive shaft which is effective for driving a driven shaft at different speeds through relatively slow and fast power trains which are individually established in driving relation between said shafts when first and second clutches of such transmission are respectively engaged; the combination of a member displaceable as a precedent to engagement of the second of said clutches, obstructing means for preventing such displacement of said displaceable member but renderable inactive so as to permit displacement of said member, means operable coordinately with the operation of the engine throttle for rendering said obstructing means inactive pursuant to the opening of said throttle, and means operable under control of said first clutch for incapacitating said rendering means while the first clutch is disengaged.

3. In a control for use in conjunction with a change-speed transmission driven from a throttle-controlled engine and wherein such transmission has an engine-driven drive shaft which is effective for driving a driven shaft at different speeds through relatively slow and fast power trains which are individually established in driving relation between said shafts when first and second clutches of such transmission are respectively engaged; the combination of a member displaceable from an initial position as a precedent to engagement of the second of said clutches, means for preventing such displacement of said displaceable member but renderable inactive so as to permit displacement of said member, means operable coordinately with the operation of the engine throttle for rendering said obstructing means inactive pursuant to the opening of said throttle, means operable under control of said first clutch for incapacitating the rendering function of said coordinately operable means while the first clutch is disengaged, and means operable pursuant to disengagement of the first clutch for disengaging the second clutch and restoring said displaceable member to its initial position.

4. In a control for use in conjunction with a change-speed transmission driven from a throttle-controlled engine and wherein such transmission has an engine-driven drive shaft which is effective for driving a driven shaft at different speeds through relatively slow and fast power trains which are individually established in driving relation between said shafts when first and second clutches of such transmission are respectively engaged; the combination of means effective during engagement of the first clutch for urging the second clutch engaged, means for preventing engagement of the second clutch but renderable inactive so as to permit such engagement thereof, means operable coordinately with the operation of the engine throttle for rendering said obstructing means inactive pursuant to the opening of said throttle, and means operable under control of said first clutch for incapacitating the rendering function of said coordinating operable means while the first clutch is disengaged.

5. In a control for use in conjunction with a change-speed transmission driven from a throttle-controlled engine and wherein such transmission has an engine-driven drive shaft which is effective for driving a driven shaft at different speeds through relatively slow and fast power trains which are individually established in driving relation between said shafts when first and second clutches of such transmission are respectively engaged; the combination of means effective during engagement of the first clutch for urging the second clutch engaged, means establishable in a serviceable condition for preventing engagement of the second clutch but renderable inactive so as to permit such engagement thereof, means operable coordinately with the operation of the engine throttle for rendering said clutch-engagement-preventing means inactive pursuant to the opening of said throttle, means operable pursuant to disengagement of the first clutch for disengaging the second clutch and re-establishing said serviceable condition of said clutch-engagement-preventing means, and means operable under control of said first clutch for incapacitating the rendering function of said coordinately operable means while the first clutch is disengaged.

6. In a control for use in conjunction with a change-speed transmission driven from a throttle-controlled engine and wherein such transmission has an engine-driven drive shaft which is effective for driving a driven shaft at different speeds through relatively slow and fast power trains of which the fast power train is established in driving relation between said shafts when a clutch of said transmission is engaged; the combination of means effective during establishment of the slower of said power trains for urging said clutch engaged, means for preventing engagement of said clutch but renderable inactive so as to permit such engagement thereof, throttle-correlated means operable pursuant to manipulation of the engine throttle for rendering said clutch-engagement-preventing means inactive, and means operable pursuant to disestablishment of the driving relation of said slower speed train for incapacitating the rendering function of said throttle-correlated means.

7. In a control for use in conjunction with a change-speed transmission driven from a throttle-controlled engine and wherein such transmission has an engine-driven drive shaft which is effective for driving a driven shaft at different speeds through relatively slow and fast power trains of which the fast power train is established in driving relation between said shafts when a clutch of said transmission is engaged; the combination of means effective during establishment of the slower of said power trains for urging said clutch engaged, means establishable in a serviceable condition for preventing engagement of said clutch but renderable inactive so as to permit such engagement thereof, throttle-correlated means operable pursuant to manipulation of the engine throttle for rendering said clutch-engagement-preventing means inactive, and means operable pursuant to disestablishment of the driving relation of said slower speed train for reestablishing the serviceable condition of said clutch-engagement-preventing means and for incapacitating the rendering function of said throttle-correlated means.

8. In combination, a change-speed transmission comprising an engine-driven drive shaft, a driven shaft, a power train for driving the driven shaft from the drive shaft at a relatively low speed, a higher speed power train for driving the driven shaft from the drive shaft at a relatively high speed, an intermediate speed power train for driving the driven shaft from the drive shaft at an intermediate speed, ratchetable jaw clutches of which a first is engageable pursuant to effecting a shift in driving relation from the low speed train to the second speed train and of which a second is engageable concurrently with the engagement of the first for effecting the driving relation of the higher speed power train, said low and intermediate speed power trains each being overrunnable, the second clutch being operable when placed in a ratcheting condition to facilitate overrunning of the intermediate speed power train for speeds of the driven shaft not exceeding the speed of the drive shaft and being operable through the higher speed power train to cause the driven shaft to drive the drive shaft when the driven shaft tends to exceed the speed of said drive shaft, a member displaceable as a precedent to engagement of the second clutch but said member facilitating the ratcheting condition of said clutch irrespective of said displacement, obstructing means for preventing such displacement of said displaceable member but renderable inactive to facilitate displacement of said member, means operable coordinately with the operation of the engine throttle for rendering said obstructing means inactive pursuant to the opening of said throttle, and means operable under control of said first clutch for incapacitating said rendering means while the first clutch is disengaged.

OSCAR H. BANKER.

REFERENCES CITED

The following references are of record in the file of this patent:

UNITED STATES PATENTS

| Number | Name | Date |
| --- | --- | --- |
| 2,140,502 | Banker | Dec. 20, 1938 |
| 2,160,385 | Kraemer et al. | May 30, 1939 |
| 2,199,095 | Banker | Apr. 30, 1940 |
| 2,240,621 | Johns | May 6, 1941 |
| 2,329,724 | Maurer | Sept. 21, 1943 |
| 2,336,513 | Taylor | Dec. 14, 1943 |
| 2,394,580 | Banker | Feb. 12, 1946 |